United States Patent [19]

Beach et al.

[11] Patent Number: 4,890,968
[45] Date of Patent: Jan. 2, 1990

[54] STACKABLE ROOFING WASHER

[75] Inventors: John R. Beach, Elmhurst; Syed R. Hasan, Palatine; Donald W. Noren, Glenview; Craig A. Hindman; Ernest S. Santi, both of Palatine, all of Ill.

[73] Assignee: Illinois Tool Works Inc., Chicago, Ill.

[21] Appl. No.: 311,013

[22] Filed: Feb. 15, 1989

[51] Int. Cl.$^4$ ............................................. F16B 43/00
[52] U.S. Cl. .................... 411/531; 405/259; D8/353; D8/399
[58] Field of Search ............... 411/351, 353, 344; 405/259, 260, 261; D8/353, 399

[56] References Cited

U.S. PATENT DOCUMENTS

| D. 29,834 | 12/1898 | Baringer | D8/399 |
| D. 246,346 | 11/1977 | Strunk | D8/399 X |
| D. 263,678 | 4/1982 | Dewey | D8/399 |
| D. 263,927 | 4/1982 | Dewey | D8/399 |
| D. 263,928 | 4/1982 | Dewey | D8/399 |
| D. 275,452 | 9/1984 | Payne | D8/399 |
| 4,112,693 | 9/1978 | Collin et al. | 405/259 X |

Primary Examiner—Timothy V. Eley
Assistant Examiner—Frances Chin
Attorney, Agent, or Firm—Neal C. Johnson; Thomas W. Buckman

[57] ABSTRACT

A machine for fastening one or more layers of roofing material to an underlayment, and a stackable washer therefor. A chute receives a stack of such washers. A shuttle displaces a single washer to a separated position when moved in one direction, to which the shuttle is biased, releases the single washer when moved oppositely. A gate, which cooperates with camming surfaces on the respective washers, restrains the overlying washer in the stack against being displaced with the single washer and restrains the single washer from being displaced from the separated position. Various components are provided by linking a stand-up screw gun of a known type to the shuttle. The stackable washer is embossed so that each such washer and like overlying and underlying washers in a stack contact each other at three or more places, which define tangent planes intersecting planes defined by planar areas on such washers at angles more than 45° but less than 90° whereby such washers are spaced from each other around their entire peripheries. Notches in the washers cooperate with ribs in the chute to ensure that a stack of the washers is oriented properly when fitted into the chute.

6 Claims, 5 Drawing Sheets

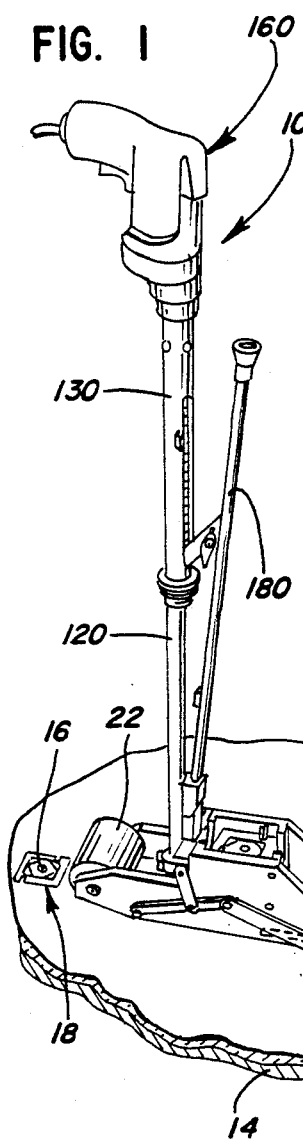
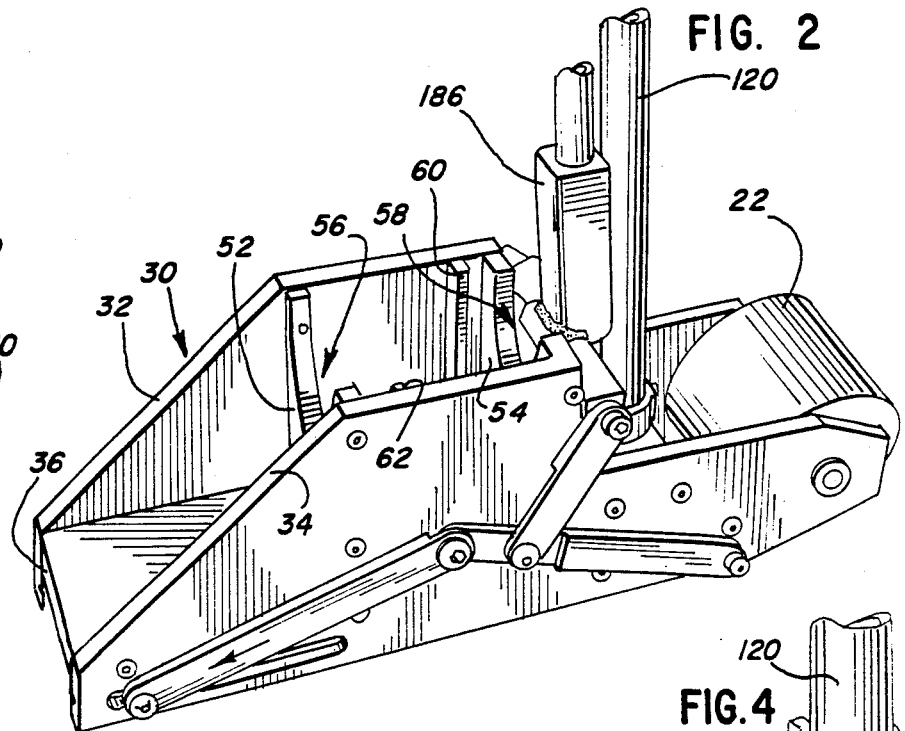
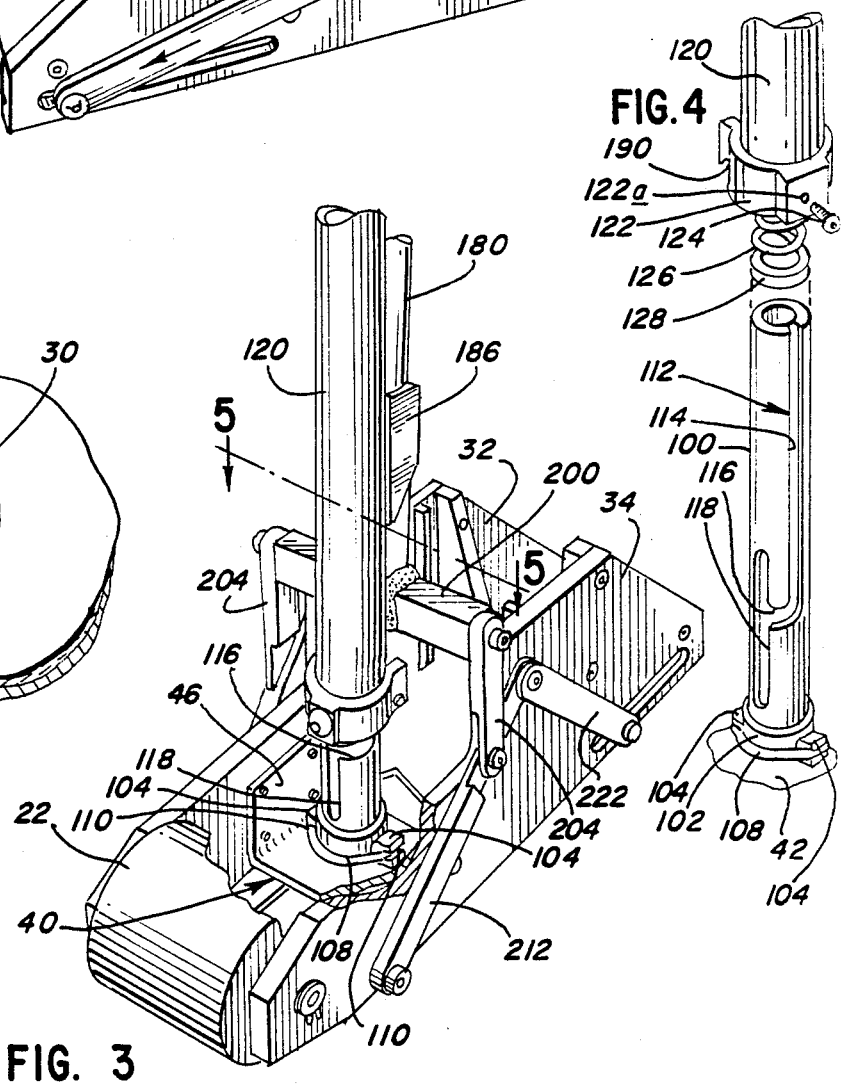

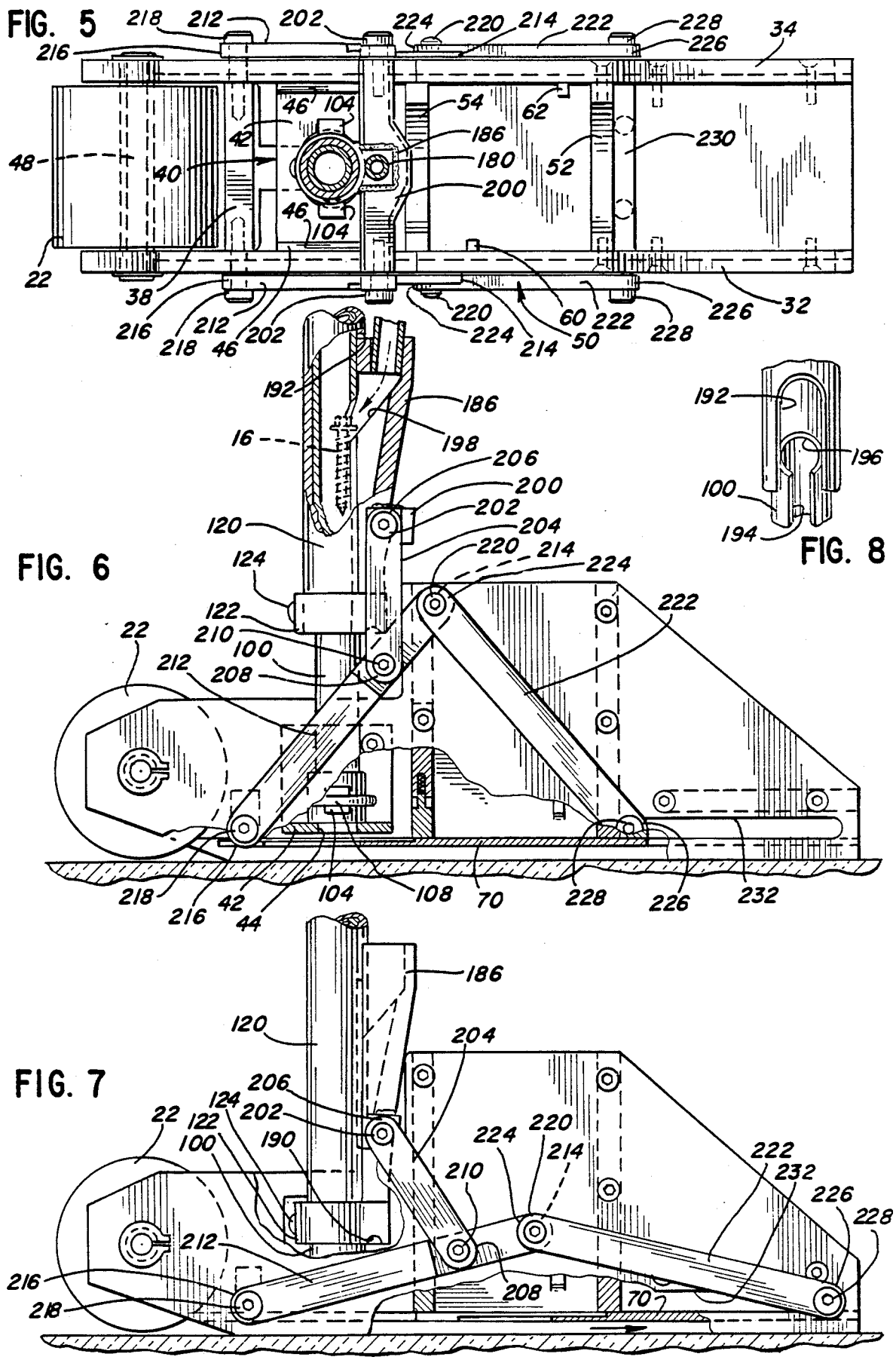

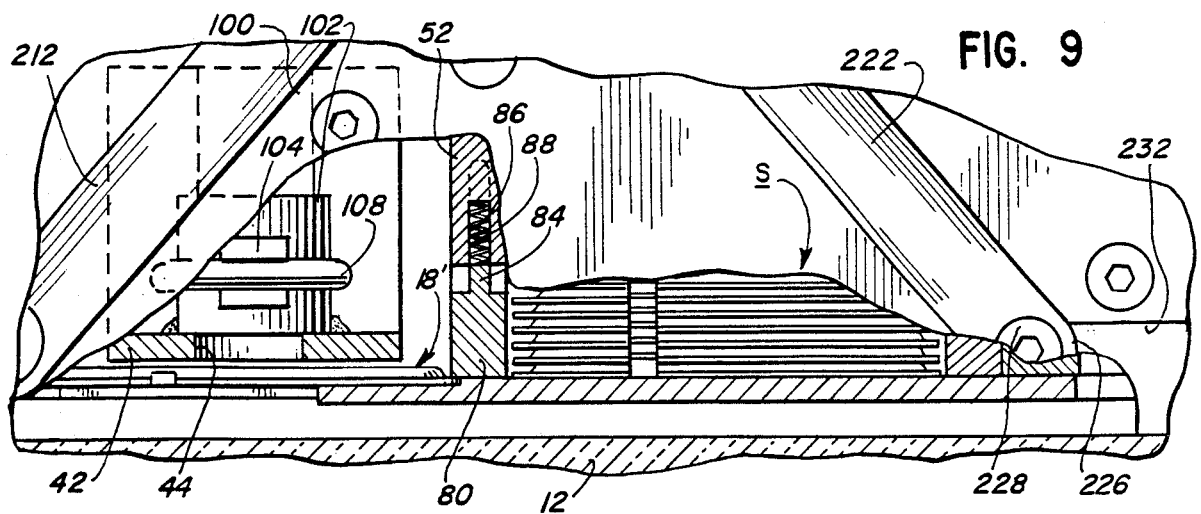
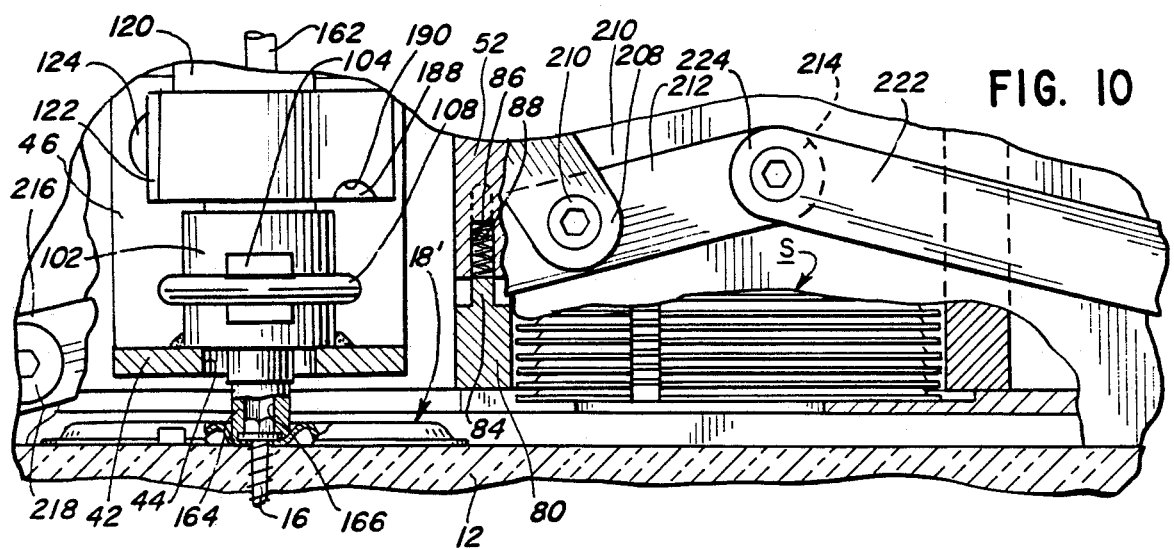
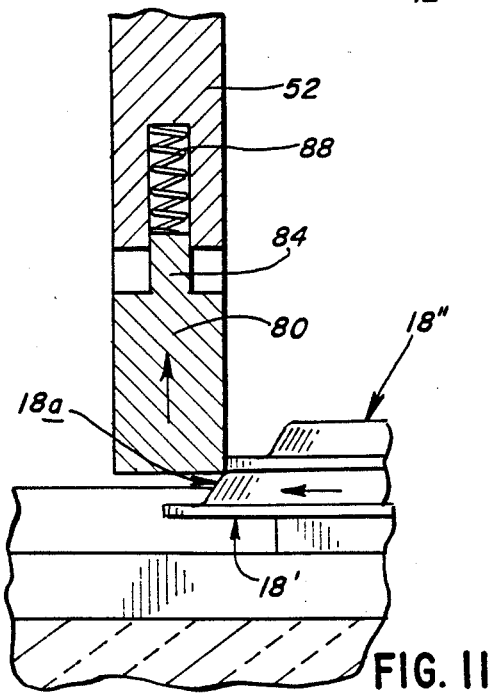
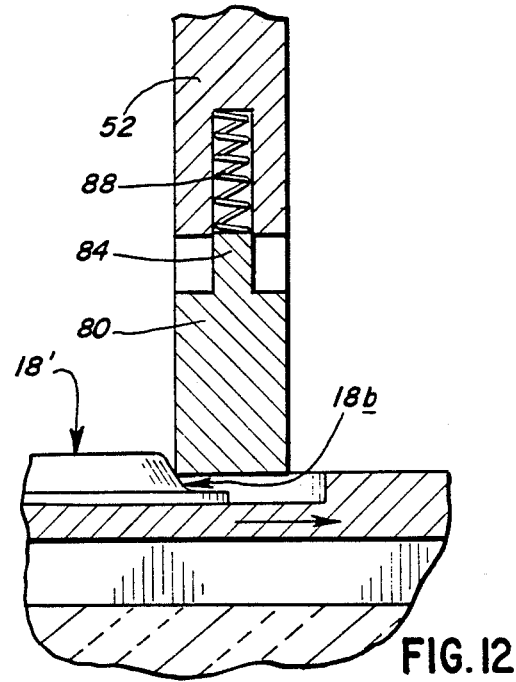

FIG. 13
FIG. 14
FIG. 15
FIG. 16
FIG. 17
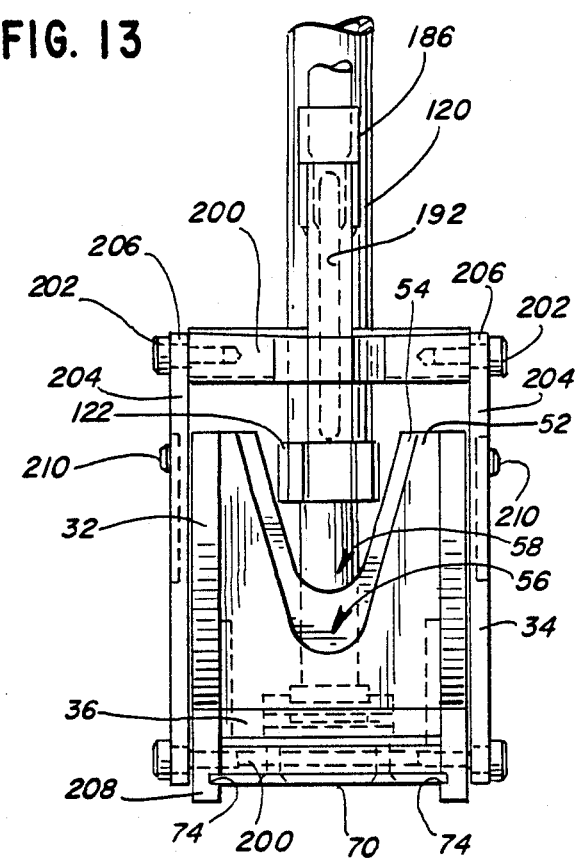
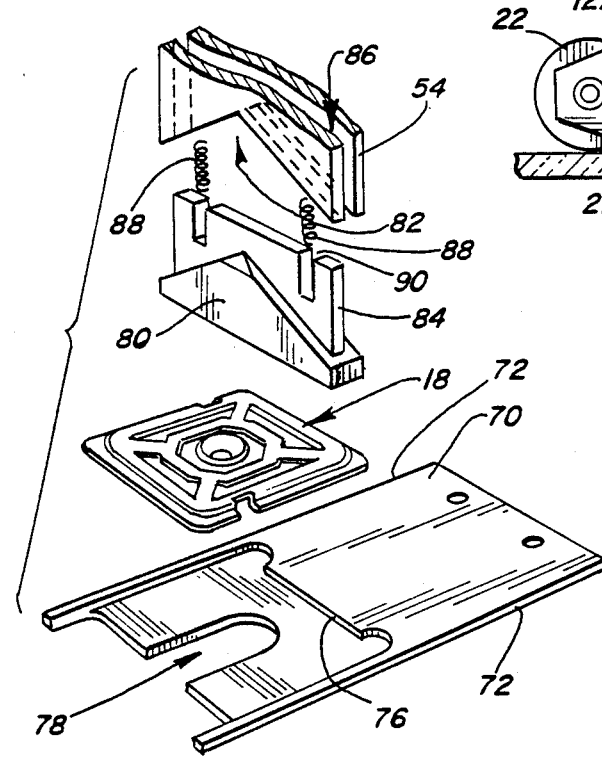
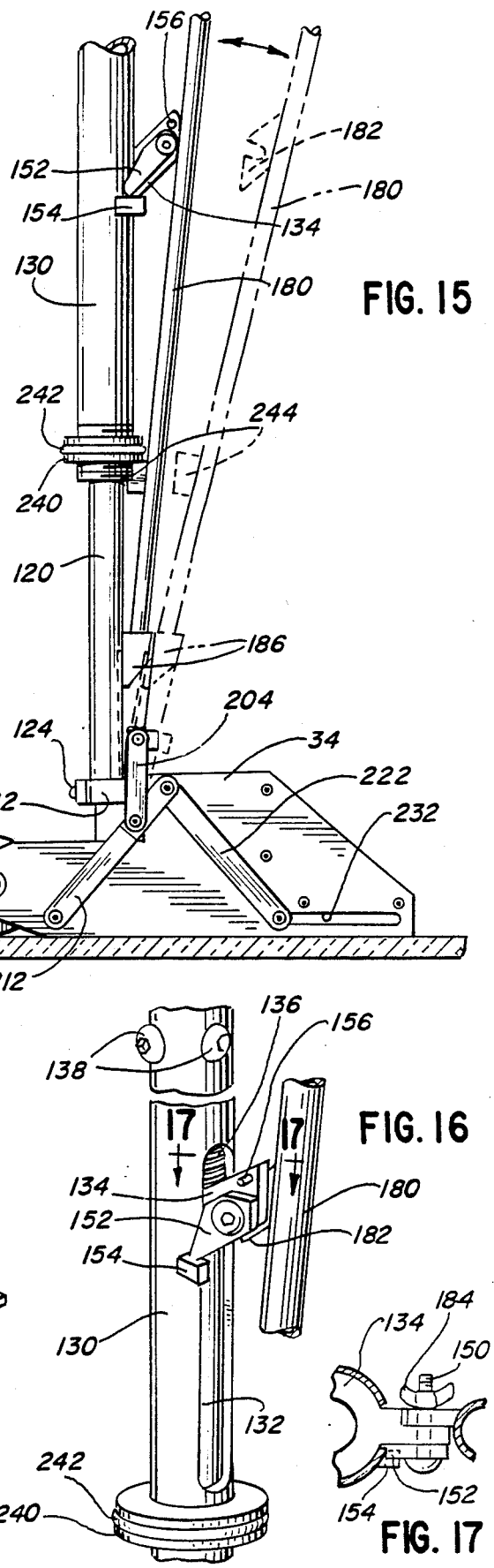
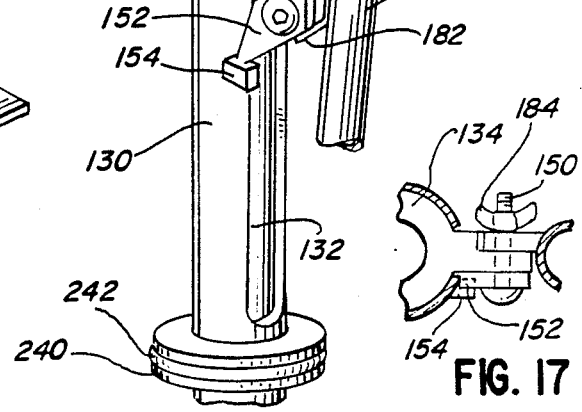

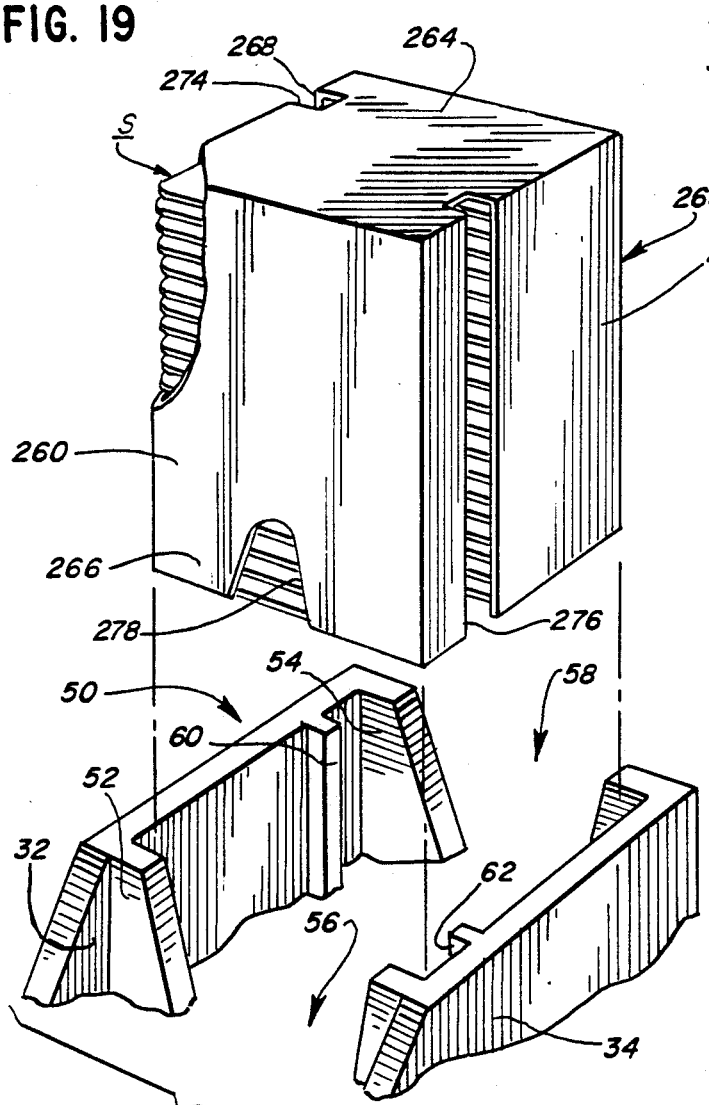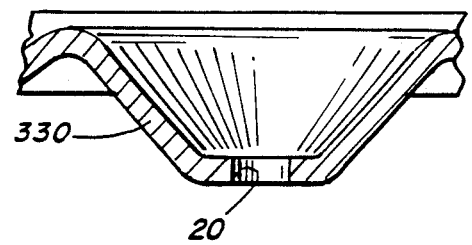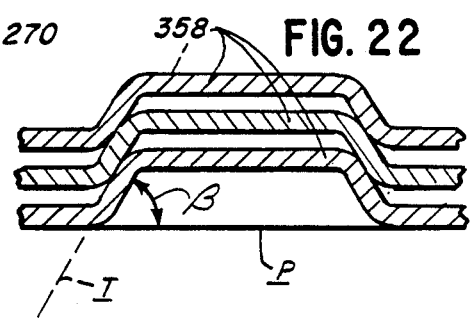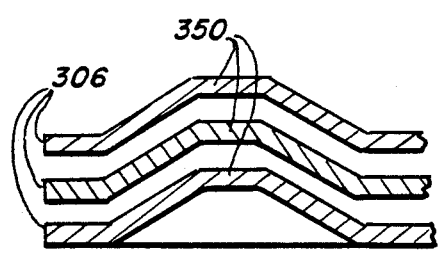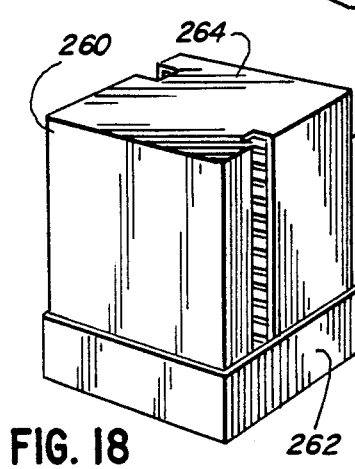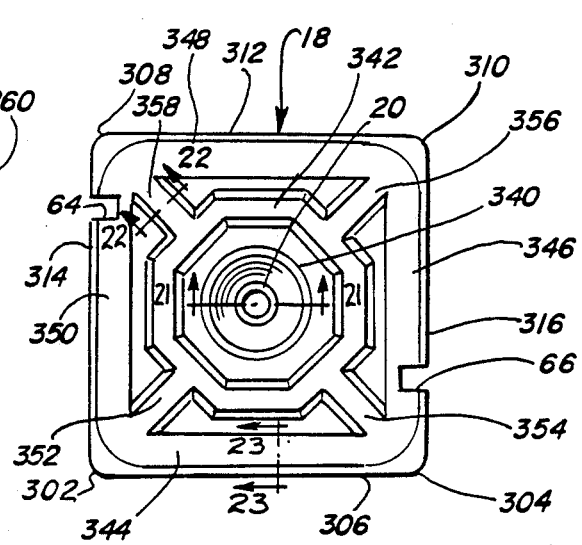

4,890,968

STACKABLE ROOFING WASHER

TECHNICAL FIELD OF THE INVENTION

This invention pertains to an improved machine for fastening one or more layers of roofing material, such as a blanket of roofing insulation or a roofing membrane, to an underlayment, such as a wooden roof or a corrugated metal roof. The machine dispenses roofing washers individually onto such material and drives a fastener having a head, such as a screw, through a central aperture of each washer, through such material, and into the underlayment, until the fastener bears against the washer. This invention pertains also to an improved, stackable washer, preferably embossed, which is dispensable by such a machine.

BACKGROUND OF THE INVENTION

Various portable or semi-portable machines are known which dispense roofing washers individually onto roofing material, such as a blanket of roofing insulation or a roofing membrane, and which drive a fastener having a head, such as a screw, through the central aperture of such a washer, through the roofing material, and into an underlayment, such as a wooden roof or a corrugated metal roof, until the fastener bears against the washer. Herein, terms such as "roof" and "roofing" are to be broadly understood, so as to cover roofs, decks, ceilings, and similar structures.

Such a portable or semi-portable machine is exemplified in Boegel U.S. Pat. No. 4,246,939 wherein different mechanisms are disclosed (see FIGS. 19, 20, and 21, and FIG. 22) for dispensing washers individually from a stack of washers in a magazine. In such a portable or semi-portable machine, it is known to place a weighted plunger onto the uppermost washer in the stack to restrain the washers in the stack from cascading from the stack if the magazine is tipped so as to tip the stack.

Another such machine is exemplified in Mays U.S. Pat. No. 4,657,167 wherein different mechanisms are disclosed (see FIGS. 3, 4, and 5 and FIGS. 6 through 10) for dispensing washers (which therein are called washer-like plates or disks) from a stack of washers in a magazine. No provision is disclosed to restrain the washers in the stack from cascading from the stack if the magazine is tipped so as to tip the stack. Tipping is required (see column 4, lines 31 through 36) to allow laterally mounted wheels of the disclosed machine to roll on an underlying surface.

Roofing washers of particular interest are disclosed in Dewey U.S. Pat. Des. 263,678, Dewey U.S. Pat. Des. 263,927, and Dewey U.S. Pat. Des. 263,928, which are assigned to Illinois Tool Works Inc. of Chicago, Ill., the assignee hereof. Each such washer has a central aperture, which is adapted to receive a fastener, and is embossed with a pattern of ribs so as to have positive relief and planar areas on its upper face and negative relief and planar areas on its lower face. The ribs on such washers are functional, as well as ornamental, since the ribs strengthen and rigidify such washers, which can be thus made from thin blanks.

Ordinarily, when stackable washers, such as those according to any of the Dewey patents noted above, are made in a mechanical or hydraulic press employing metal-working dies, a lubricating medium is used which tends to leave some residue on each washer. It is uneconomical to clean such residue from each washer. Because such residue tends to be somewhat adherent, and because such washers tend to be tightly stacked, it is difficult to dispense such washers individually in a washer-dispensing machine, since a plurality of such washers tend to be simultaneously displaced from a stack of such washers in such a machine, whereby the machine can become jammed.

Although the washers noted above are typically square, except for rounded corners, circular roofing washers and oblong roofing washers also are known. Circular roofing washers have particular utility with roofing membranes, which tend to be easily punctured.

Washers with countersunk apertures are preferred for overlying more compressible material, such as a blanket of roofing insulation, whereas washers without countersunk apertures are preferred for overlying less compressible material, such as a roofing membrane, which would be typically applied over a blanket of roofing insulation. It is desirable to countersink the heads of fasteners used to fasten a blanket of roofing insulation to an underlayment, if a roofing membrane is to be later applied over the blanket of roofing insulation, in an effort to avoid puncturing the roofing membrane where the fastener heads would underlie the roofing membrane and where a worker might step carelessly or unwittingly.

Stackable washers according to Dewey U.S. Pat. Des. 268,678, as produced from steel blanks and embossed to countersink their central apertures relative to positive relief on their upper faces and negative relief on their lower faces, and as sold by ITW-Buildex (a division of Illinois Tool Works Inc.) of Itasca, Ill., have enjoyed commercial success in the United States in recent years.

Also of particular interest, screw guns equipped with screw-feeding attachments, so-called stand-up screw guns, are exemplified in Murray U.S. Pat. No. 3,960,191, Dewey U.S. Pat. No. 4,236,555, and Dewey U.S. Pat. No. 4,397,412, which are assigned to Illinois Tool Works Inc., the assignee hereof. Such stand-up screw guns, as known heretofore, are not capable of dispensing washers but are used to drive screws through central apertures of manually placed washers, through roofing materials, and into underlayments. Such stand-up screw guns, as sold by ITW-Buildex (a division of Illinois Tool Works Inc.) of Itasca, Ill., under its ACCUDRIVE XL trademark, have enjoyed commercial success in the United States in recent years.

Although known portable or semi-portable machines which dispense roofing washers individually onto roofing material, such as a blanket of roofing insulation or a roofing membrane, and which drive a fastener having a head, such as a screw, through a central aperture of each washer, through the roofing material, and into an underlayment, such as a wooden roof or a corrugated metal roof, until the fastener bears against such washer, have proved to be generally satisfactory, there has been a need for an improved machine having such capabilities. Moreover, there has been a need for an improved, stackable washer, which is dispensable by such a machine.

SUMMARY OF THE INVENTION

This invention provides an improved machine for use with stackable roofing washers having central apertures and for fastening one or more layers of roofing material, such as a blanket of roofing insulation or a roofing membrane, to an underlayment, such as a wooden roof or a corrugated metal roof, by fasteners having heads, such as screws, with such a washer between the head of each fastener and such material. The machine dispenses such washers individually onto such material, at spaced locations, and drives such a fastener through a central aperture of each washer, through such material, and into the underlayment, until the fastener bears against such washer.

The washer-dispensing and fastener-driving machine provided by this invention has a base supporting a chute adapted to receive a stack of such washers to be individually dispensed by such machine. A shuttle is mounted to the base for horizontal movement between a normal position and a displaced position. The shuttle is adapted to engage a single washer from the stack when the shuttle is in the displaced position, to displace the single washer from the stack to a separated position by positive engagement of the shuttle with the single washer as the shuttle moved from the displaced position to the normal position, and to release the single washer in the separated position as the shuttle next moves from the normal position to the displaced position.

The machine further comprises washer-restraining means for restraining the washer overlying the single washer in the stack against being displaced from the stack with the single washer as the shuttle moves from the displaced position to the normal position and for restraining the single washer from being displaced from the separated position as the shuttle moves from the normal position to the displaced position after having displaced the single washer from the stack to the separated position.

Preferably, if such washers are embossed so as to form camming surfaces in suitable patterns on one broad face of each such washer, and if such washers are stacked so that the broad face formed with camming surfaces on each such washer is its upper face, such means may comprise a gate, which is mounted to the base for movement toward and away from a lowermost position. The gate, which is biased toward the lowermost position, provides sufficient clearance for all or substantially all of a single washer being displaced by the shuttle from the stack to the separated position to pass beneath the gate but insufficient clearance for any overlying washer in the stack also to pass beneath the gate with the single washer. The gate, which is cammed upwardly by camming surfaces on the upper face of the single washer as the single washer is displaced by the shuttle, so as to allow the single washer to pass beneath the gate, engages camming surfaces on the upper face of the single washer so as to restrain the single washer against being displaced from the separated position as the shuttle next moves from the normal position to the displaced position.

Preferably, for use with stackable roofing washers embossed so as to form camming surfaces in such a pattern on one broad face of each such washer, stacked so that the broad face formed with camming surfaces on each such washer is its upper face, and provided at the periphery of each such washer with at least one notch, preferably with two such notches at spaced locations on its periphery, as exemplified by an improved washer described below as provided by this invention, the chute is provided with a rib corresponding to each such notch, the rib or ribs being fittable into the notch or notches of each such washer and of like overlying and underlying washers in a stack received by the chute to restrain such washers against cascading from the stack if the chute is tipped so as to tip the stack. There is no need for a weighted plunger to restrain such washers against cascading from the stack.

Moreover, the washer-dispensing and fastener-driving machine provided by this invention comprises shuttle-biasing means for biasing the shuttle to the normal position but permitting the shuttle to be forcibly moved from the normal position to the displaced position and shuttle-moving means arranged to be operator-actuated and to be normally deactuated for moving the shuttle forcibly from the normal position to the displaced position when actuated and for moving the shuttle as biased by the shuttle-biasing means from the displaced position to the normal position when deactuated, along with fastener-driving means adapted to be operator-actuated for driving a fastener through the central aperture of the single washer while the single washer is in the separated position and the shuttle is in the displaced position.

The shuttle-biasing, shuttle-moving, and fastener-driving means may be advantageously provided by linking a stand-up screw gun of a type exemplified in Murray U.S. Pat. No. 3,960,191, Dewey U.S. Pat. No. 4,236,555, and Dewey U.S. Pat. No. 4,397,412 to the shuttle, via a mechanical linkage. The base, the chute, and the shuttle, as combined with such a linkage, may be thus regarded as an attachment for such a screw gun, which can be independently used without a washer-dispensing capability.

This invention also provides an improved, stackable, roofing washer for use with roofing material, such as a blanket of roofing insulation or a roofing membrane. The washer is individually machine-dispensable, as by the washer-dispensing and fastener-driving machine described above as provided by this invention.

Each washer provided by this invention is similar to known washers described above in having a periphery, in having a central aperture adapted to receive a fastener, such as a screw, and in being embossed with a pattern of ribs, which rigidify the washer and are spaced outwardly from the central aperture, so as to have positive relief and planar areas on a given one of its broad faces, and so as to have negative relief and planar areas on the other one of its broad faces. Moreover, when a stack of such washers is made for use in the washer-dispensing and fastener-driving machine described above as provided by this invention, such relief forms camming surfaces on the given one of the broad faces of each such washer for purposes described above.

Each washer may be advantageously made from a steel blank, which may be so embossed in a mechanical or hydraulic press employing matched dies and a lubricating medium, and which may be previously or subsequently galvanized. As embossed, such washer is nestable with like overlying and underlying washers in a stack such that positive relief on such washer nests into negative relief on an overlying washer in the stack, and such that positive relief on an underlying washer in the stack nests into negative relief on such washer.

Each washer provided by this invention is distinguishable from known washers described above in being embossed such that such washer and like overlying and underlying washers in a stack contact each other at three or more places, which are defined by ribs on such washer and ribs on like underlying and overlying washers in the stack, and which define tangent planes intersecting planes defined by planar areas on each of the broad faces of such washer at angles more than 45° but less than 90°, preferably about 60°. These places, which are located where positive relief nests into vertical relief, are spaced from the central aperture of such washer and from the peripheries of such washer and of like washers in the stack. Consequently, such washer and like overlying and underlying washers in the stack are spaced from each other around their entire peripheries, so as to facilitate their being individually machine-dispensible with little tendency to adhere to each other even if coated partly or wholly with residue of a lubricating medium.

If tangent planes, as defined by the ribs where each washer provided by this invention and like overlying and underlying washers in a stack contact each other, were to intersect planes defined by planar areas on each of the broad faces of the washer at angles of 45° or less, such washer and like overlying and underlying washers in the stack could be tightly stacked, rather than spaced from each other around their entire peripheries. Angles less than 90° are required for nesting. As mentioned above, angles of about 60° are preferred.

Theoretically, two stacked washers can contact each other at three places only. Practically, however, two stacked washers can appear to contact each other at more than three places. This invention does not distinguish between actual contact, in a theoretical sense, and apparent contact, in a practical sense.

In some forms that have been envisioned, each washer provided by this invention is embossed with radial ribs, preferably with at least three ribs, the rib or ribs defining positive relief on the given one of its broad faces, defining negative relief on the other one of its broad faces, and defining such places where the washer and like overlying and underlying washers in a stack contact each other. The ribs of such washer may be advantageously disposed in regularly spaced intervals around its central aperture.

Preferably, such washer is embossed with four such ribs, which extend in radial directions relative to the central aperture. The broad faces of such washer may be substantially square with four such ribs extending diagonally along the broad faces. Desirably, if such washer is used to overlie more compressible material, such as a blanket of roofing insulation, rather than less compressible material, such as a roofing membrane, such washer may be also embossed so as to countersink its central aperture relative to positive relief on the given one of its broad faces and to negative relief on the other one of its broad faces. Such washer may be further embossed, as for ornamental purposes or for strengthening and rigidifying purposes, so long as any further embossing does not cause such washer and like overlying and underlying washers in a stack to be no longer separated around their entire peripheries.

Each washer provided by this invention may be also formed with at least one notch at its periphery, preferably with two notches at spaced locations on its periphery, the notch or notches adapting such washer to fit into a washer-receiving chute of a washer-dispensing machine, such as the washer-dispensing and fastener-driving machine noted above, in which the chute is provided with a rib corresponding to each notch, the rib or ribs being fittable into the notch or notches to restrain such washer and like overlying and underlying washers in a stack from cascading from the stack if the chute is tipped so as to tip the stack.

Preferably, if such washer is embossed so as to have positive relief on one broad face and negative relief on its other face, so as to have a countersunk portion, which includes its central aperture, or so as to achieve both purposes, the notch or notches are located so as to perform another function, namely to insure that the broad face having positive relief is the upper face when such washer is fitted into the chute with the rib or ribs fitting into the notch or notches of such washer. The rib or ribs prevents or prevent such washer from being rotated when fitted into the chute and from being inverted when fitted into the chute.

A stack of such washers, each having a notch or spaced notches for purposes described above, may be advantageously packaged in a container, which is fittable with the stack into such a washer-receiving chute having a rib or spaced ribs fittable into the notch or notches for such purposes, and which has side walls covering peripheries of such washers in the stack, except for a slot or spaced slots exposing the notches and allowing the rib or ribs to fit through the slot or slots into the notch or notches to restrain such washers in the stack against cascading from the stack if the chute is tipped so as to tip the stack.

These and other objects, features, and advantages of this invention are evident from the following description of a preferred embodiment of the machine provided by this invention and by the following description of a preferred embodiment of the washer provided by this invention, with reference to the accompanying drawings.

BRIEF DESCRIPTION OF THE DRAWINGS

FIG. 1 is a perspective view of a preferred embodiment of the washer-dispensing and fastener-driving machine provided by this invention. FIG. 1 also shows, fragmentarily, a sheet of roofing material fastened to an underlayment in one location by a screw having a head and an integral washer and with a roofing washer being used.

FIGS. 2 and 3 respectively are enlarged, fragmentary, perspective views taken from different directions to show lower portions of the machine shown in FIG. 1. Certain components are shown in different positions in FIGS. 2 and 3.

FIG. 4 is a fragmentary exploded view of certain components of the machine as shown in FIG. 3.

FIG. 5 is a partly sectional, top plan view of lower portions of the machine as shown in FIG. 3 with certain components removed to allow other components to be better shown. Where sectioned, FIG. 5 is taken along a plane including line 5—5 of FIG. 3 in a direction indicated by arrows.

FIGS. 6 and 7 are partly fragmentary, elevational views, as taken from one side of lower portions of the machine as shown in FIG. 3. FIG. 6 shows a shuttle in a normal position. FIG. 7 shows the shuttle in a displaced position. FIG. 6 also shows, in phantom lines, a screw being fed into the machine.

FIG. 8 is a slightly enlarged, quarter-turn rotated, fragmentary, perspective detail of a screw-receiving tube shown fragmentarily in FIG. 6.

FIGS. 9 and 10 are enlarged, fragmentary details of certain components of the machine as shown in FIGS. 6 and 7 respectively. FIGS. 9 and 10 also show a stack of roofing washers being handled by the machine.

FIGS. 11 and 12 are further enlarged, fragmentary details of a gate and a shuttle of the machine as shown in FIGS. 6, 7, 9, and 10. FIG. 11 shows the gate coacting with camming surfaces of a roofing washer being displaced by the shuttle. FIG. 12 shows the gate coacting with camming surfaces of a roofing washer to restrain the roofing washer from returning with the shuttle.

FIG. 13 is a front elevational view of the machine as shown in FIG. 3.

FIG. 14 is a slightly enlarged, partly fragmentary, exploded, perspective detail of certain components of the machine, namely a shuttle and a gate. FIG. 14 also shows a roofing washer dispensable by the machine.

FIG. 15 is a slightly reduced, partly fragmentary, elevational view, as taken from the same side of the machine. FIG. 15 shows a screw-feeding tube in an installed position in full lines and in a removed position in phantom lines.

FIG. 16 is a somewhat enlarged, slightly, rotated, fragmentary detail of certain elements shown in FIG. 15. FIG. 17 is a fragmentary, sectional view, as taken along line 17—17 of FIG. 16 in a direction indicated by arrows.

FIG. 18 is a perspective view of a stack of roofing washers in a container having a removable lower cover for use in the machine as shown in FIGS. 9 through 10.

FIG. 19 is a greatly enlarged, partly fragmentary, exploded, perspective view of the stack of roofing washers in the container. FIG. 19 shows the washer-filled container being inserted manually into a chute of the machine after the removable lower cover has been removed. The removable lower cover is not shown in FIG. 19.

FIG. 20 is a top plan view of a preferred form of such a washer. FIGS. 21, 22, and 23 respectively are greatly enlarged, fragmentary, sectional views, as taken along lines 21—21, 22—22, and 23—23 respectively of FIG. 20 in directions indicated by arrows. FIGS. 22 and 23 show, fragmentarily, several such washers in a stack.

DETAILED DESCRIPTIONS OF PREFERRED EMBODIMENTS

As shown in FIGS. 1 through 17, a washer-dispensing and fastener-driving machine 10, which constitutes a preferred embodiment of the washer-dispensing and fastener-driving machine provided by this invention, is used to fasten a sheet 12 of roofing material, such as a blanket of roofing insulation, to an underlayment 14, such as a wooden roof, by screws 16 of a known type having hexagonal heads and integral washers and with a roofing washer 18 between the head and integral washer of each screw 16 and the sheet 12. Suitable screws having hexagonal heads and integral washers are available commercially from ITW Buildex (a division of Illinois Tool Works Inc.) of Itasca, Ill., under its HEXCEL trademark. The machine 10 dispenses such washers 18 individually onto the sheet 12, at spaced locations, and drives such a screw 16 through a central aperture 20 of each roofing washer 18, through the sheet 14, and into the underlayment 14, until the head and integral washer of the screw 16 bear against the roofing washer 18. The machine 10 is equipped with a roller 22, which enables the machine 10 to be manually moved to another location.

The machine 10 comprises a base 30 with a front portion, as shown at its lower right in FIG. 1, a rear portion, as shown at its upper left in FIG. 1, and intermediate portions between its front and rear portions. The machine 10 is assembled with machine screws of a conventional type having enlarged heads with hexagonal sockets, as shown, from various components, namely opposite, upright, side plates 32, 34, a shelf 36, which is mounted between the plates 32, 34, at the front portion of the base 30, a brace 38, which is mounted between the plates 32, 34, in the rear portion of the base 30, and a U-shaped bracket 40, which is mounted between the plates 32, 34, in an intermediate portion of the base 30. The bracket 40 has a bight 42, which has a central aperture 44, and opposite, upright, end portions 46, each of which is mounted to a respective one of the side plates 32, 34.

The roller 22 is mounted for free rotation on an axle 48, which is supported at its ends by the plates 32, 34 respectively. Rather than a solid roller as shown, a spool-like roller (not shown) having two wheel-like portions or separate wheels (not shown) may be instead used.

The machine 10 comprises a washer-receiving chute 50, which is adapted to receive a stack S of such washers 18, the washer 18 being spaced from each other in the stack S around their entire peripheries in a manner to be later described. The chute 50 is defined by a front wall 52, a rear wall 54, and side walls constituted by portions of the side plates 32, 34, between the walls 52, 54. The walls 52, 54, are mounted between the side plates 32, 34, in an intermediate portion of the base 30, between the shelf 36 and the bracket 40. The front wall 52 has a larger, V-shaped cutout 56, which facilitates loading the chute 50 with the stack S of such washers 18. The rear wall 54 has a smaller, V-shaped cutout 58, which provides clearance for a crosspiece to be later described.

The plate 32 is provided with a vertical rib 60, which is spaced by a given distance (see FIG. 5) from the front wall 52, where a portion of the side plate 32 provides a side wall of the chute 50. The plate 34 is provided with a vertical rib 62, which is spaced by a greater distance (see FIG. 5) from the rear wall 54, where a portion of the side plate 34 provides a side wall of the chute 50. The ribs 60, 62, which may be advantageously provided by machined inserts (not shown) in machined grooves (not shown) in the side plates 32, 34, fit into and cooperate with notches 64, 66, in the lateral edges of each roofing washer 18 in the stack S in a manner to be later described, thereby to restrain the roofing washers 18 in the stack S against cascading from the stack S if the machine 10 including the chute 50 is tipped so as to tip the stack S. The ribs 60, 62, cause the chute 50 to be assymetrically shaped for a purpose to be later described.

The machine 10 comprises a shuttle 70, which is mounted to the base 30 for horizontal movement between a normal position, in which the shuttle 70 is shown in FIGS. 6 and 9, and a displaced position, in which the shuttle 70 is shown in FIGS. 7 and 10. The shuttle 70 is biased toward the normal position in a manner to be later described. The shuttle 70 has opposite, parallel, side edges 72, each of which fits slidably into a longitudinal groove 74 (see FIG. 13) in a respective one of the side plates 32, 34. A rear portion of the shuttle 70 is recessed (see FIG. 14) so as to adapt the shuttle 70 to engage a single washer 18′ from the stack S (see FIG. 10) when the shuttle 70 is in the displaced position, the single washer 18′ being the lowermost washer in the stack S, and to displace the single washer 18′ from the stack S to a separated position (see FIG. 9) by positive engagement of a front edge 76 of the recessed rear portion of the shuttle 70 with a trailing edge of the single washer 18′ as the shuttle 70 moves from the displaced position to the normal position. The shuttle 70 has a rearwardly opening, U-shaped cutout 78, in its recessed rear portion, so as to accommodate a countersunk portion of the single washer 18′. The shuttle 70 thus is adapted to release the single washer 18′ in the separated position as the shuttle 70 next moves from the normal position to the displaced position.

The machine 10 comprises a gate 80, which restrains the overlying washer 18″ in the stack S against being displaced from the stack S with the single washer 18′ as the shuttle 70 moves from the displaced position to the normal position, and which restrains the single washer 18′ from being displaced from the separated position as the shuttle 70 moves from the normal position to the displaced position after having displaced the single washer 18′ from the stack S to the separated position. The gate 80 is mounted to the base 30, in an inverted, V-shaped cutout 82 in the rear wall 54 of the chute 50, for vertical movement through a limited range toward and away from a lowermost position, in which the gate 80 is shown in FIG. 9. The gate 80 has upwardly facing portions conforming to the cutout 82, as shown, so as to center the gate 80 when the gate 80 is moved to an uppermost position, in which the gate 80 engages upper edges of the cutout 82. An upstanding tongue 84, which is an integral extension of the gate 80, fits slidably into a downwardly opening groove 86 in the rear wall 54 of the chute 50. The gate 80 is biased downwardly, toward the lowermost position, by a pair of coiled springs 88, which are seated in upwardly opening notches 90 in the tongue 84, and which bear against an upper edge of the groove 86.

In the lowermost position, the gate 80 bears at its lower edge against the shuttle 70, either at opposite edges of the shuttle 70 so as to span the recessed rear portion of the shuttle 70, when the shuttle 70 is in the displaced position, or across the shuttle 70, when the shuttle 70 is in the normal position. In the lowermost position, the gate 80 provides sufficient clearance for the single washer 18′ being displaced by the shuttle 70 from the stack S to the separated position to pass beneath the gate 80 but insufficient clearance for the overlying washer 18″ in the stack S also to pass beneath the gate 80. The gate 80 is cammed upwardly by camming surfaces 18a with which the single washer 18′ is embossed on its upper face and near its leading edge (see FIG. 11) as the single washer 18′ is displaced by the shuttle 70, so as to allow the single washer 18′ to pass beneath the gate 80. As cammed upwardly, the gate 80 engages the leading edges of the overlying washers 18 in the stack S (see FIG. 11) so as to restrain the overlying washers 18 against being displaced with the single washer 18′. After the single washer 18 has passed beneath the gate 80 except for a marginal portion including the trailing edge of the washer 18′, the single washer 18′ is considered to have been moved to the separated position, and the gate 80 engages camming surfaces 18b with which the single washer 18 is embossed on its upper face and near its trailing edge (see FIG. 12) so as to restrain the single washer 18′ against being displaced from the separated position as the shuttle 70 next moves from the normal position to the displaced position.

Moreover, the machine 10 comprises shuttle-biasing means, shuttle-moving means, and fastener-driving means. The shuttle-biasing means biases the shuttle 70 to the normal position but permits the shuttle 70 to be forcibly moved (against such bias) from the normal position to the displaced position. The shuttle-moving means, which is arranged to be operator-actuated and to be normally deactuated, moves the shuttle 70 forcibly (against such bias) from the normal position to the displaced position when actuated and moves the shuttle 70 as biased by the shuttle-biasing means from the displaced position to the normal position when deactuated. The fastener-driving means is used to drive a screw 16 through the central aperture of the single washer 18′ while the single washer 18′ is in the separated position and the shuttle 70 is in the displaced position.

The shuttle-biasing, shuttle-moving, and fastener-driving means are provided by linking a stand-up screw gun of a type exemplified in Murray U.S. Pat. No. 3,960,191, Dewey U.S. Pat. No. 4,236,555, and Dewey U.S. Pat. No. 4,397,412 to the shuttle 70, via a mechanical linkage, as described below. The disclosures of Murray U.S. Pat. No. 3,960,191, Dewey U.S. Pat. No. 4,236,555, and Dewey U.S. Pat. No. 4,397,412 are incorporated herein by reference.

Thus, a tubular nosepiece 100 is welded to the bight 42 of the bracket 40 so as to extend upwardly, and so as to communicate with the central aperture 44 in the bight 42, and is provided at its lower end with an integral collar 102 and with a pair of jaws 104, which extend radially into diametrically opposed apertures 106 in the integral collar 102, and which are biased inwardly in a radial sense by an elastomeric O-ring 108 disposed around the integral collar 102 and seated removably in suitable grooves 110 in the respective jaws 104. Similar jaws biased by such an O-ring are disclosed in Dewey U.S. Pat. No. 4,236,555. The jaws 104, which are adapted to be outwardly cammed in a manner to be later described, position a screw 16 in axial alignment with a driving bit to be later described, prevent the screw 16 from dropping through the nosepiece 100 before the screw 16 is driven by the driving bit, but permit the screw 16 to be downwardly ejected as the screw 16 is driven.

As shown in FIG. 4, the nosepiece 100 is provided externally with a J-shaped groove 112, which has a longer, vertical portion 114 leading to the upper end of the nosepiece 100, a curved, transitional portion 116, and a shorter, vertical portion 118. The curved, transitional portion 116 leads to the lower end of the longer, vertical portion 114 and to a midsection of the shorter, vertical portion 118.

As shown in FIGS. 3 and 4 and elsewhere, a tubular element 120 is telescoped over the tubular nosepiece 100. A horseshoe-shaped bracket 122, which partly surrounds the tubular element 120, is welded to the tubular element 120. The bracket 122 receives a machine screw 124 having a threaded shank 124a which passes through an aperture 122a, in the bracket 122, and through an axially aligned, threaded aperture (not shown) in a lower end portion of the tubular element 120, and which extends into the groove 112 when the tubular element 120 is telescoped over the tubular nosepiece 100. When the tubular element 120 and the tubular nosepiece 100 are assembled, the threaded shank 124a of the machine screw 124 is manipulated down the longer vertical portion 114, through the curved transitional portion 116, and into the shorter vertical portion 118, which allows a limited range of vertical movement of the tubular element 120 relative to the tubular nosepiece 100. A coiled spring 126 is fitted into the tubular element 120 so as to bear at its lower end, via an annular washer 128 fixed to the lower end of the coiled spring 126, against the upper end of the tubular nosepiece 100, and so as to bear at its upper end against an annular stop (not shown) within the tubular element 120, thereby to bias the tubular element 120 upwardly in the limited range of vertical movement of the tubular element 120 relative to the tubular nosepiece 100. The threaded shank 124a of the machine screw 124 engages the annular washer 128 at the lower end of the coiled spring 126 so as to restrain the coiled spring 126 against being ejected from the tubular element 120 when the tubular element 120 and the tubular nosepiece 100 are disassembled.

As shown in FIGS. 1 and 15, a tubular element 130 is telescoped over the tubular element 120. The tubular element 130 is provided with a wide vertical slot 132. A fitment 134, which is attached by machine screws to an upper end portion of the tubular element 120, extends outwardly through the slot 132, which provides a limited range of vertical movement of the tubular element 130 relative to the tubular element 120. A coiled spring 136 is fitted into the tubular element 130 so as to bear at its lower end against the tubular element 120, and so as to bear at its upper end against an annular stop (not shown) which is mounted within the tubular element 130 by machine screws 138 mounted in threaded apertures (not shown) in the tubular element 130, thereby to bias the tubular element 130 upwardly in the limited range of vertical movement of the tubular element 130 relative to the tubular element 120.

A bolt 150, which is threaded through the fitment 134, serves as a pivot for a latching element 152, which can be selectively pivoted between an operative position (see FIGS. 16 and 17) wherein the latching element 152 engages a fixed stop 154 welded to the tubular element 130, so as to prevent upward movement of the tubular element 130 relative to the tubular element 120, and an inoperative position (see FIG. 15) wherein such movement is permitted by the latching element 152. A pintle 156, which extends laterally from the fitment 134, limits pivotal movement of the latching element 152.

A trigger-actuatable, electrically powered screw gun 160 is mounted in a known manner to the upper end of the tubular element 130. The screw gun 160 comprises an elongate, rod-like driver 162 carrying a driving bit 164, which can be removably attached to the driver 162 (see FIG. 10) at its lower end. The driving bit 164 has a downwardly opening, hexagonal socket 166, which is adapted to drive a screw 16 (see FIG. 10) fed in a manner to be next described, when the screw gun 160 is actuated with the socket 166 engaged with the head of the screw 16. The socket 166 can be so engaged only when the tubular element 130 has been moved forcibly downward along the tubular element 120 and the tubular element 120 has been moved forcibly downward along the tubular nosepiece 100. The driving bit 164 is adapted to cam the jaws 104 outwardly when moved downwardly with the tubular elements 120, 130. The coiled springs 126, 136, are selected to have spring characteristics enabling the tubular element 120 to be so moved only after the tubular element 130 has been so moved so as to cause the coiled spring 126 to be fully compressed, or nearly so.

A screw-feeding tube 180 is mounted removably to the tubular element 120. A fitment 182, which is welded to the tube 180, can be removably mounted to the fitment 134 (which, as described above, is attached to an upper end portion of the tubular element 120) by the bolt 150, which receives a wing nut 184, as shown in FIGS. 15, 16, and 17. A screw-deflecting slide 186, which is mounted rigidly to the lower end of the tube 180, has a pair of ears 188, which fit into downwardly opening recesses 190 in distal ends of the horseshoe-shaped bracket 122 (see FIG. 7) when the fitment 182 is mounted to the fitment 134, so as to mount the tube 180 to the tubular element 120. Where the tubular element 120 confronts the slide 186, the tubular element 120 is provided with a wide, vertical slot 192 (see FIG. 6 and 8) providing sufficient clearance for a screw 16 fed through the tube 180. Where the vertical slot 192 confronts the tubular nosepiece 100 when the tubular element 120 is in its uppermost position relative to the tubular nosepiece 100, the tubular nosepiece 100 is provided with a narrow, vertical slot 194 having an enlarged upper end 196 and providing sufficient clearance for a screw 16 fed through the tube 880 when the tubular element 120 is in such position, so long as the head of the screw 16 is upward as the screw 16 is fed through the tube 180. The enlarged upper end 196 of the slot 194 provides sufficient clearance for the head and integral washer of the screw 16 whereas the remaining portions of the slot 194 provide sufficient clearance only for the threaded shank of the screw 16. The slide 186 has, on each side, camming surfaces 198 (see FIG. 6) which cooperate with the integral washer of the screw 16 so as to deflect the head and integral washer of the screw 16 through the slot 192 into the enlarged upper end 196 of the slot 194. FIG. 6 shows, in phantom lines, a screw 16 after the screw 16 has passed through the slots 192, 194. When the tubular element 120 is not in its uppermost position relative to the tubular nosepiece 100, the vertical slot 192 does not confront the vertical slot 194, and a screw 16 at the vertical slot 192 cannot enter the vertical slot 194.

As described so far, except for the welded connection of the tubular nosepiece 100 to the bight of the bracket 40, and except for certain features to be later described, the tubular nosepiece 100, the tubular element 120, the tubular element 130, the screw gun 160, the feed tube 180, and associated components described above are similar to similarly functioning components of stand-up screw guns sold heretofore by ITW-Buildex (Illinois Tool Works Inc.), Itasca, Ill., under its ACCUDRIVE XL trademark. Since such components and their functions are known to those skilled in the art, further description of such components and their functions is not necessary, except as given below.

A crosspiece 200, which is welded to the slide 186 so as to extend over the side plates 32, 34, has a pivot pin 202 with an enlarged head at each end of the crosspiece 200. The pivot pins 202 extend beyond the plates 32, 34, on each side of the base 30. A driving link 204 is connected at its upper end 206 to the pivot pin 202 at each end of the crosspiece 200. Each driving link 204 is connected at its lower end 208, via an integral pin 210, to a rear toggle link 212 at a location between the ends of the rear toggle link 212. The pivot pin 210 is closer to the upper end 214 of the rear toggle link 212 and further from its lower end 216. Each rear toggle link 212 is connected at its lower end 216, via a pivot pin 218 extending through a suitable aperture in a respective one of the side plates 32, 34, to a respective end of the brace 38. Each rear toggle link 212 is connected at its upper end 214, via an integral pin 220, to a front toggle link 222 at the upper end 224 of the front toggle link 222. Each front toggle link 222 is connected at its lower end 226, via a pivot pin 228, to the respective ends of a brace 230, which overlies a front end portion of the shuttle 70 and is assembled thereto by machine screws. Each pivot pin 228 extends through a longitudinal slot 232 in a respective one of the side plates 32, 34.

Thus, when the screw-feeding tube 180 and the screw-deflecting slide 186 (which is mounted rigidly thereto) are moved downwardly, the mechanical linkage comprising the driving links 204, the rear toggle links 212, and the front toggle links 222 causes the shuttle 70 to move toward the displaced position. The V-shaped cutout 58 in the rear wall 54 provides clearance for the crosspiece 200, which has a rearwardly extending portion, as shown. Also, when the tube 180 and the slide 186 are moved upwardly, the same linkage causes the shuttle 70 to move toward the normal position. Moreover, because the coiled spring 136 biases the tubular element 130 upwardly along the tubular element 120, the coiled spring 136 also biases the shuttle 70 toward the normal position.

The tubular element 130 is threaded at its lower end, as shown, where it is provided with a threaded collar 240 which can be manually rotated on the lower end of the tubular element 130. An O-ring 242 is mounted around the threaded collar 240 so as to bias a ball (not shown) into releasable holding engagement with a respective one of four axial grooves spaced regularly around the collar 240. The screw-feeding tube 180 is provided with a fixed stop 244, against which the threaded collar 240 bears when rotated downwardly on the lower end of the tubular element 120. Rotation of the threaded collar 240 on the tubular element 130, as limited by the fixed stop 244, adjusts the maximum downward extension of the driving bit 164.

As shown in FIGS. 18 and 19, the stack S of washers 18 may be conveniently packaged in a novel container 260, which may be advantageously thermoformed from a suitable, opaque, polymeric material, such as poly-(ethylene terephthalate) or polypropylene, or which may be alternatively made from paperboard or card stock with glued flaps. A removable, lower cover 262 is provided, which may be similarly thermoformed or otherwise made, as from the material of the container 260. As shown in FIG. 19, the stack S may be conveniently left in the container 260, after the cover 262 has been removed, when the stack S is inserted manually into the washer-receiving chute 50, which provides sufficient clearance for such a container having thin walls.

The container 260 has a top wall 264, a rear wall, which is hidden in FIGS. 18 and 19, a front wall 266, a side wall 268, which is shown fragmentarily in FIGS. 18 and 19, and a side wall 270. When the stack S is left in the container 260, the container 260 rests on edge portions of the shuttle 70, so as to span the recessed rear portion of the shuttle 70, when the shuttle 70 is in the displaced position. Otherwise, as shown, the container 260 is seated across the shuttle 70.

The top wall 264 and the side wall 268 are provided with a vertical slot 274, which is disposed so as to expose the notches 64 in the washers 18 in the stack S. The top wall 264 and the side wall 270 have a vertical slot 276, which is disposed so as to expose the notches 66 in the washers 18 in the stack S. Thus, the slot 274 permits the rib 60 to fit through the slot 274 into the notches 64 in the washers 18 in the stack S and the slot 276 permits the rib 62 to fit through the slot 276 into the notches 66 in the washers 18 in the stack S, thereby to restrain the washers 18 in the stack S against cascading from the stack S if the machine 10 including the chute 50 is tipped so as to tip the stack S.

The front wall 266 has an inverted, V-shaped cutout 278, which facilitates handling the stack S in the container 260, after the cover 262 has been removed, as when the stack S is to be manually inserted into the chute 50. Similarly, the front wall may have an inverted, V-shaped cutout (not shown) at its lower edge.

As shown in a preferred embodiment in FIGS. 20 through 23, each washer 18 is substantially square, except for rounded corners 302, 304, at its leading edge 306 and rounded corners 308, 310, at its trailing edge 312. Each washer 18 is provided, at one lateral edge 314, with a notch 64, which is spaced by a given distance from its trailing edge 312. Each washer 18 is provided, at its opposite lateral edge 316, with a notch 66, which is spaced by a greater distance from its leading edge 306. The notches 66, 64, adapt each washer 18 to fit into the chute 50 with the rib 60 fitting into the notch 64 and with the rib 62 fitting into the notch 66. When the stack S of such washers 300 is fitted into the chute 50, either in the container 260 after the cover 262 has been removed or apart from any container, the respective ribs, by fitting into the respective notches in the washers 18 in the stack S, restrain the washers 18 in the stack S against cascading from the stack S if the machine 10 including the chute 50 is tipped so as to tip the stack S. There is no need for an overlying weight to restrain the washers 18 in the stack S from doing so.

Generally, each washer 18 is made from a steel blank by embossing such blank as in a mechanical or hydraulic press (not shown) employing matched dies and a lubricating medium, so as to have positive relief and planar areas on its upper face, so as to have negative relief and planar areas on its lower face, and so as to have a countersunk portion 330, which includes the central aperture 20 of such washer 18. Positive relief on the upper face of such washer 18 provides camming surfaces 18a, 18b, as discussed above. The notches 64, 66, cause such washer 18 to be assymetrically shaped, as the chute 50 is shaped, thereby to insure that the broad face having positive relief is the upper face with the countersunk portion 330 below the periphery of such washer 18. The ribs 60, 62, prevent such washer 18 from being inserted in an improper orientation into the chute 50.

As shown, each washer 18 is embossed with an ornamental and functional pattern of ribs including an annular rib 340 in a circular pattern around the countersunk portion 330, an annular rib 342 in an octagonal pattern around the annular rib 340, peripheral ribs 344, 346, 348, 350, in a square pattern along peripheral areas of such washer 18 and radial ribs 352, 354, 356, 358, along diagonal paths, between straight sections of the annular rib 342 and intersections formed by the peripheral ribs 344, 346, 48, 350. Such ribs, which strengthen and rigidify such washer 18, define positive relief and planar areas on one broad face of such washer 300 and negative relief and planar areas on the other face of such washer 300. Thus, in the stack S comprising a plurality of the washers 18, positive relief defined by such ribs on each washer 18 nests into negative relief defined by such ribs on an overlying washer in the stack and positive relief defined by an underlying washer in the stack S nests into negative relief defined by such ribs on such washer 18.

The radial ribs 352, 354, 356, 358, are configured in cross-section so as to define at least three places, which are located where positive relief nests into negative relief, at which each washer 18 and like overlying and underlying washers in the stack S contact each other, and which define tangent planes T intersecting planes P defined by planar areas on each of the upper and lower faces of such washer 18 at angles more than 45° but less than 90°, preferably 60°, as shown in FIG. 22, which shows several of the washers 18 from the stack S, and in which such an angle is indicated by a Greek letter beta. Consequently, each washer 18 and like overlying and underlying washers 18 in the stack S are spaced from each other around their entire peripheries and between planar areas on such washers 18, as shown in FIG. 23, in which the leading edges 306 of several of the washers 18 from the stack S are shown. Because they are spaced from each other around their entire peripheries and between planar areas thereon, such washers 18 have little tendency to adhere to each other when dispensed individually by the machine 10 even if coated partly or wholly with residue of a lubricating medium.

As a preliminary step, operation of the machine 10 requires the stack S of roofing washers 18, either in the container 260 after the cover 262 has been removed or apart from any container, to be manually inserted into the washer-receiving chute 50 with the rib 60 fitting into the notches 64 in the stacked washers 18 and with the rib 62 fitting into the notches 66 in the stacked washers 18.

Thereupon, after a screw 16 has been fed manually through the screw-feeding tube 180, by being dropped into the tube 180, so as to be temporarily held by the jaws 104 at the lower end 102 of the tubular nosepiece 100, the screw gun 160 is pressed down so as to cause the shuttle 70 to move from the normal position to the displaced position, in which a single washer 18' from the stack S, namely the lowermost washer from the stack S, is received by the recessed rear portion of the shuttle 70. When the screw gun 160 then is released, the coiled spring 136 returns the tubular element 130 upwardly along the tubular element 120, whereupon the shuttle 70 returns to the normal position and displaces the single washer 18' from the stack S to the separated position, in which the central aperture 20 of the single washer 18 is aligned vertically and axially with the central aperture 44 of the bight 42 of the bracket 40, with the tubular nosepiece 100 having the jaws 104 at its integral collar 102, and with the driver 162 and the driving bit 164.

Next, after the machine has been positioned appropriately on the sheet 12 of roofing material, after the stack S of roofing washers 18 has been inserted in the chute 50, the screw gun 160 again is pressed downwardly, whereupon the shuttle 70 is displaced from the normal position to the displaced position and the single washer 18' is released and drops onto the sheet 12 of roofing material, and whereupon the driving bit 164 cams the jaws 104 outwardly and the head of the screw 16 becomes engaged in the socket 166 of the driving bit 164. The screw gun 160 can be then actuated with downward pressure on the screw gun 160 so as to drive the screw 16 through the central aperture 20 of the washer 18' which has dropped onto the sheet 12 of roofing material, through the sheet 12 of roofing material, and into the underlayment 14, until the integral washer of the screw 16 bears against such washer 18'.

The machine 10 may be then moved to another location on the sheet 12 of roofing material where the machine 10 can be again operated in like manner.

Various modifications may be made in the machine 10, the washers 18, or both without departing from the scope and spirit of this invention.

We claim:

1. A stackable, individually machine-dispensable, roofing washer for use with roofing material, such as a blanket of roofing insulation or a roofing membrane, said washer having a periphery, having a central aperture adapted to receive a fastener, and being formed with at least one notch at the periphery, the notch adapting said washer when stacked with a plurality of other washers in a stack to fit into a washer stack-receiving chute of a washer-dispensing machine, in which the chute is provided with a rib corresponding to each such notch and being fittable into each such notch to restrain said washer and the other washers in the stack received by the chute against cascading from the stack if said chute is tipped so as to tip the stack.

2. The washer of claim 1 being embossed so as to countersink the central aperture, and wherein the notches cause said washer to be assymetrically shaped around the periphery so as to insure that the countersunk aperture is below the periphery of said washer when said washer is fitted into such a chute with the rib fitting into the notch.

3. A stack of roofing washers comprising the washer of claim 1 and a plurality of other washers and being packaged in a container, which is fittable with such washers in the stack into such a washer-receiving chute, which has side walls covering peripheries of such washers in the stack except for a slot exposing the notch and allowing the rib of said chute to fit through the slot into the notch to restrain such washers in the stack against cascading from the stack if said chute is tipped so as to tip the stack, and which is openable so as to allow such washers in the stack to drop from the container when the container is fitted into said chute.

4. The washer of claim 1 being formed with two such notches at spaced locations on the periphery, the notches adapting said washer and the other washers in such a stack to fit into a washer stack-receiving chute of a washer-dispensing machine, in which the chute is provided with spaced ribs fittable into the notches so as to restrain said washer and the other washers in the stack against cascading from the stack if the chute is tipped so as to tip the stack.

5. The washer of claim 4 being embossed so as to countersink the central aperture and wherein the notches cause said washer to be assymetrically shaped around the periphery so as to insure that the countersunk aperture is below the periphery of said washer when said washer is fitted into such a chute with the ribs fitting into the notches.

6. A stack of roofing washers comprising the washer of claim 4 and a plurality of other washers and being packaged in a container, which is fittable with such washers in the stack into such a washer-receiving chute, which has side walls covering peripheries of such washers in the stack, except for spaced slots exposing the notches and allowing the ribs of the chute to fit through the slots into the notches to restrain such washers in the stack against cascading from the stack if the chute is tipped so as to tip the stack, and which is openable so as to allow such washers in the stack to drop from the container when the container is fitted into the chute.

* * * * *